Jan. 1, 1935. W. MÖLLER 1,986,761
CONTROLLING APPARATUS FOR AIRCRAFT
Filed Aug. 4, 1934   3 Sheets-Sheet 1
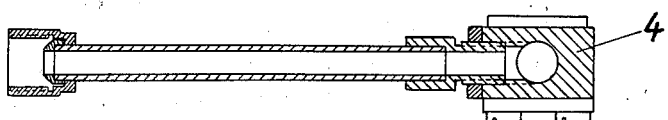
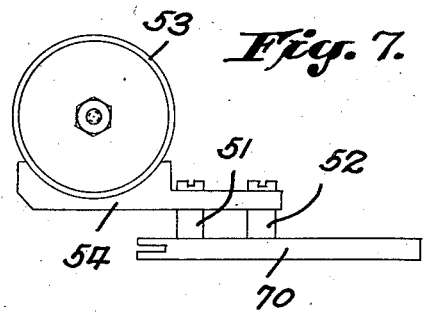
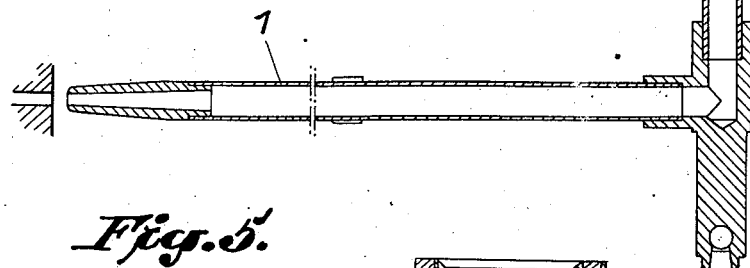
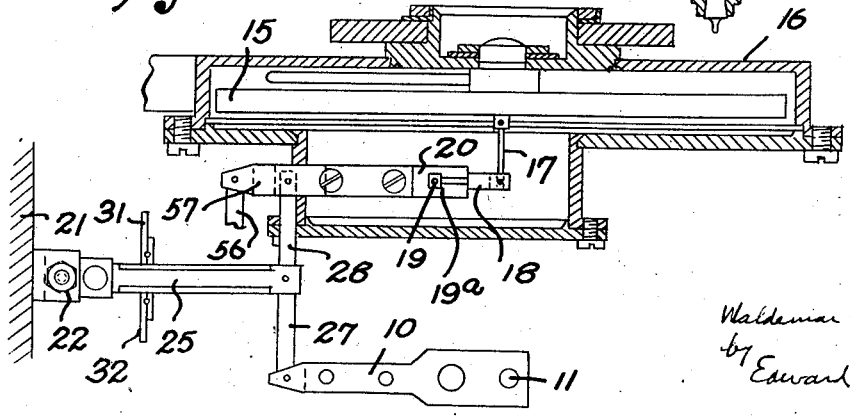
Inventor:
Waldemar Möller
by Edward H Palmer
atty.

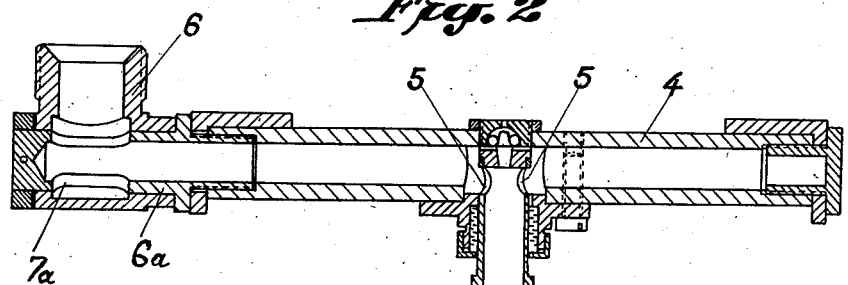
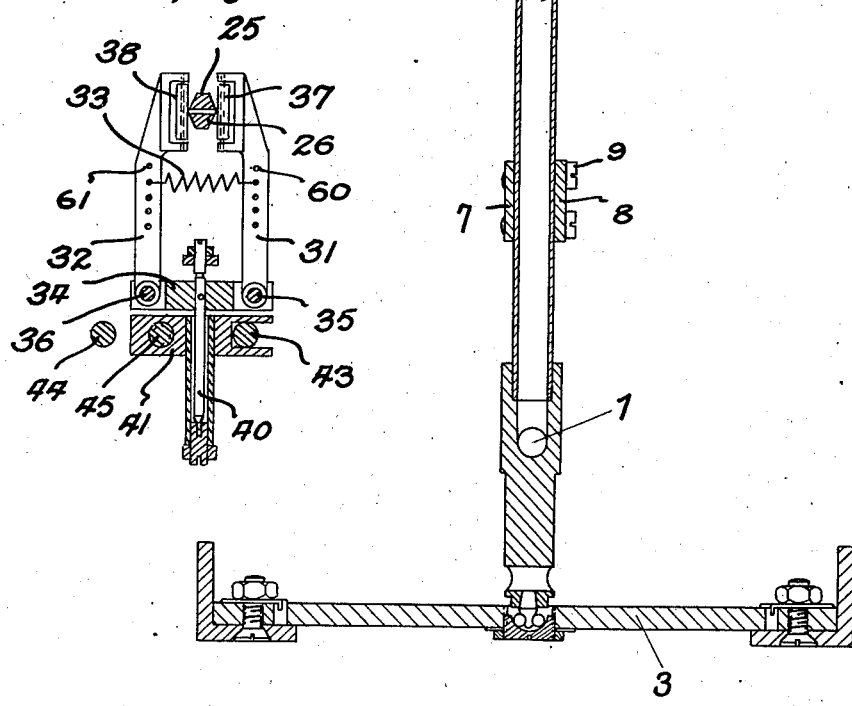

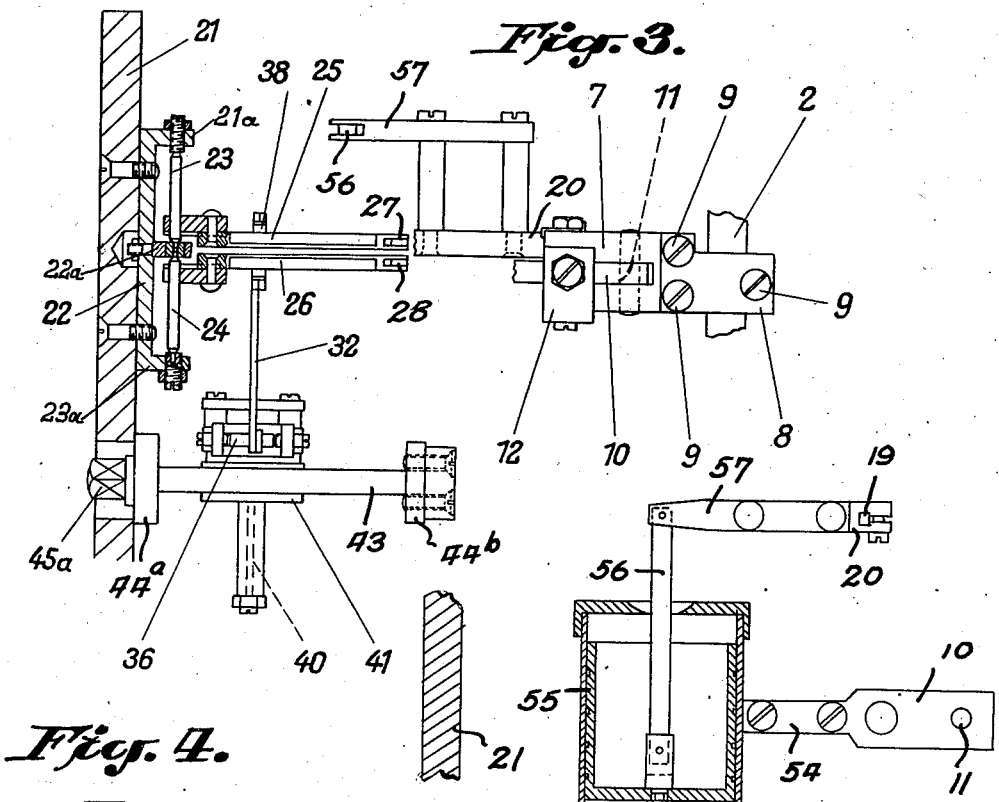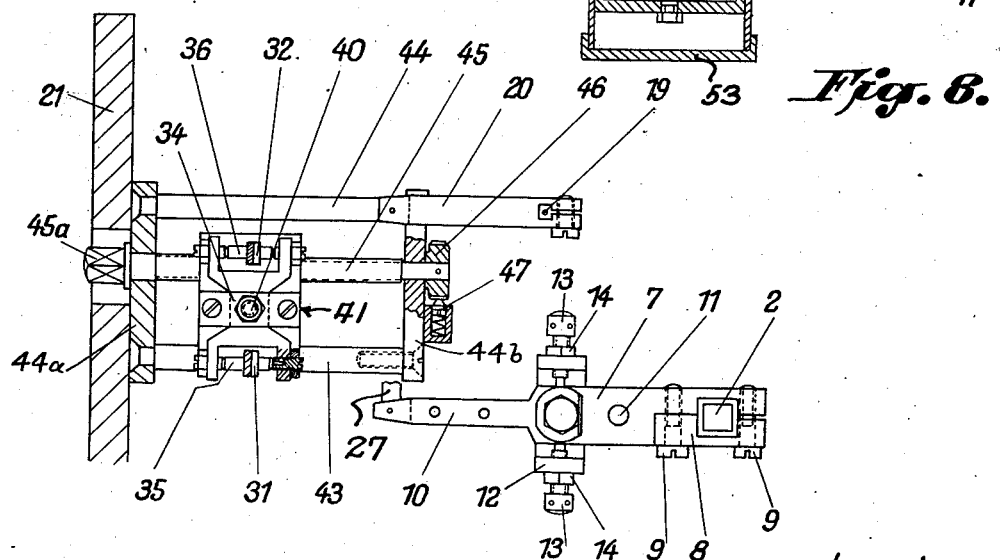

Patented Jan. 1, 1935

1,986,761

UNITED STATES PATENT OFFICE 1,986,761

CONTROLLING APPARATUS FOR AIRCRAFT

Waldemar Möller, Klein-Machnow, near Berlin, Germany, assignor to Askania-Werke A. G. vormals Central Werkstatt Dessau und Carl Bamberg-Friedenau, a German company Application August 4, 1934, Serial No. 738,519
In Germany August 2, 1933

12 Claims. (Cl. 244—29)

This invention relates to automatic controlling apparatus, more particularly automatic steering apparatus for aircraft.

In the case of heavy aircraft, automatic controlling apparatus heretofore used have not always proven adequate to keep the aircraft on its true course where pendulating occurs, particularly in squally weather. This is due to the fact that in the case of heavy aircraft the latter in returning to the correct course under the corrective influence of the automatic controlling apparatus, acquires a considerable angular velocity in its return movement. In turning about its upright axis for example, the aircraft, even when automatic restoring apparatus is used, reaches the correct course with a not inconsiderable angular velocity, owing to the relatively slight resistance offered to the turning movement by the air. This causes the aircraft to swing beyond the true course, resulting in a pendulating movement, so that as stated the aircraft cannot steer a true course, particularly in squally weather.

The present invention aims to correct these defects and in the illustrative embodiment of the invention herein described and illustrated, this is conveniently accomplished by an arrangement whereby one or more of the controlling or measuring devices which act upon the controlling means for the power that drives the steering mechanism are interconnected with said power controlling means by a resilient or yielding connection, whereby said controlling or measuring means will influence said power controlling means to turn the rudder in the opposite direction even before the aircraft has been returned to the true course under the influence of the corrective action referred to. The yielding connection may, for example, be inserted in the lever or link system which transmits the action of the measuring or controlling means to said power controlling means, whereby the action of said measuring or controlling means upon said power controlling means effects a shortening or lengthening of said lever or link system. If, for example, said measuring or controlling means acts upon said power controlling means by the rotation of a lever, two levers may, in accordance with the present invention, be substituted for said single lever, said two levers being slidable relatively to each other and connected together by a resilient connection and provided also with damping means. When the measuring or controlling means acts, said power controlling means will be actuated by said resilient connection. When said controlling means reaches its end position or more power is required for operation of said controlling means than can be delivered by said resilient connection of said two levers, said levers will separate scissorlike. As the aircraft starts to come back upon its course under the action of its steering means or rudder, said measuring or controlling means also goes back and thus influences said power controlling means to move the rudder to steer the aircraft in the opposite direction a considerable time before the aircraft itself has returned to the correct course.

The invention and its aims and objects will be readily understood from the following description taken in connection with the accompanying drawings of one embodiment of the invention herein given for illustrative purposes, the true scope of the invention being more particularly pointed out in the appended claims.

In the illustrative embodiment of the invention the controlling means for controlling the power serving to drive the steering mechanism conveniently comprises a pressure fluid jet nozzle which may be similar to that shown in German Patent No. 574,705. Referring to said patent, said jet nozzle is rotatable about a vertical axis and its discharge opening can play before two intake ports which communicate respectively with the opposite ends of a cylinder containing a piston suitably connected to the rudder or other flight controlling means of the aircraft. The jet nozzle delivers a continuous jet of pressure fluid, preferably compressed air which may be supplied thereto by a compressor driven by the aircraft motor, or from any other suitable source. When the opening of the jet nozzle is directly in front of said two intake ports, so that each of said ports receives the same amount of pressure fluid, the piston in said cylinder will remain stationary. On the other hand, said piston, and consequently the rudder will be moved in the one or the other direction according as the one or the other of said intake ports receives more fluid pressure, consequent upon deviation of said jet nozzle in the one or the other direction from its median position. The position of said jet nozzle is controlled by controlling or measuring means which are rendered operative responsive to deviation of the aircraft from the correct course and/or to speed of turning movement of the aircraft and/or acceleration of such turning movement, in case of course steering for example, by a compass, that is to say by the differential pressure diaphragm of a pneumatic compass, and preferably also by a direction indicator. Restoring means is also preferably provided conveniently comprising a spring for example which is tensioned by the lateral movements of the lateral rudder in such manner that forces of determined strengths, respectively, delivered by corresponding variations or movements of said diaphragm and/or of said direction indicator, are required in order to restore said jet nozzle to its median position between said two intake ports.

Referring to the drawings:

Figs. 1 and 2 show a side and end view, respectively, of the jet nozzle and its mounting;

Figs. 3, 4 and 5 show the mode and manner of connecting said jet nozzle with the controlling or measuring means, the compass diaphragm;

Figs. 6 to 8 illustrate details.

Referring to Figs. 1 and 2, the power controlling means, more specifically the jet nozzle 1, is connected to a hollow shaft 2 having its lower end mounted for rotary movement in a suitable ball bearing in a bottom plate 3. The upper end of said shaft 2 is also mounted in ball bearings provided in the upper wall of a preferably hollow square rod 4. The lower wall of said rod 4 is provided with a suitable packing through which said shaft 2 extends. Adjacent its upper end and within said hollow rod 4, said shaft 2 is provided with lateral ports 5—5 for compressed air. Compressed air may be supplied to the interior of said rod 4 from any suitable source of supply (not shown) through a pipe fitting 6, conveniently mounted for rotation about the closed end 6a of said rod 4 and communicating with the interior of the latter through ports 7a provided in the wall of said rod. A bracket consisting of two parts 7 and 8 suitably recessed to receive the squared portion of said rod 2, is clamped to said rod by screws 9 screwed through said part 8 and into said part 7. The free end of the part 7 of said bracket is recessed or bifurcated to receive one end of a lever 10 pivoted upon a stud or pin 11 extending through said part 7 (Figs. 3 and 4).

Means are provided to adjust said jet nozzle in its zero position relatively to the controlling or measuring means, herein the diaphragm chamber of the compass. Said means herein comprises a yoke 12 rigidly secured to said bracket 7 and having set screws 13 mounted in its two flanges and adapted to engage said lever 10 upon opposite sides. Lock nuts 14 may be provided better to preserve the adjustment of said set screws. Said lever 10 may thus be adjusted in any desired angular position relatively to said jet nozzle.

The diaphragm chamber 15 controlled by the pneumatic compass is contained in an airtight fixed casing 16, one of the compressed air supply passages (not shown), controlled by said compass, opening into said chamber 16 and, the other, into said diaphragm chamber 15. Movements in the diaphragm of said diaphragm chamber serve to rotate a shaft 19 through lever system 17, 18 connecting said diaphragm to said shaft. Said shaft 19 is provided with a portion 19a which is rectangular in cross section and carries a lever 20. To a lateral wall 21 of the apparatus there is suitably secured a bracket 22 having projecting arms 21a, 22a and 23a in which are suitably journaled two aligned shafts 23 and 24. Levers 25 and 26 are rigidly secured at one end to said shafts 23 and 24 respectively. One of said levers, the upper one 25 for example, is connected by a link 27 to lever 10 and consequently to said jet pipe, while the other lever, lever 26 for example, is connected by a link 28 to lever 20 and consequently to the diaphragm of said diaphragm chamber. Said two levers 25 and 26 would preferably be of trapezoid shape in cross section, their wider surfaces facing each other as shown in Fig. 6. Two arms 31 and 32, see Fig. 6, are mounted for rotary movement upon spindles 35 and 36 suitably mounted in a connecting piece 34. Said arms 31, 32 are drawn toward each other by a spring 33 adjustably connected thereto at its two ends in holes 60, 61, and at their free ends said arms are provided with rollers 37, 38, respectively, which engage levers 25 and 26 at opposite sides and tend to maintain said levers in superposed position. Said connecting piece 34 is rotatable about a vertical shaft 40 mounted in a carriage 41 which is adapted to slide lengthwise of two rods 43, 44 secured to and projecting from said wall 21. Movement or adjustment of said carriage 41 lengthwise of said rods 43, 44 may be effected by suitable means, said means herein conveniently comprising a screw threaded spindle 45, see Fig. 4, which is journaled at its opposite ends in fixed portions 44a, 44b of the frame, its screw threaded portion engaging a screw threaded opening in said carriage 41, see Fig. 6. The free end of said spindle 45 may be provided with a squared head 45a to facilitate rotation of said spindle by a suitable key (not shown). Yielding locking means will be provided, yieldingly to hold said spindle in adjusted position, said locking means herein conveniently comprising a spring pressed pawl 47 engaging a pinion 46 upon one end of said spindle, see Fig. 4. The levers 31 and 32 may thus be moved or adjusted longitudinally of said levers 25 and 26.

In accordance with the invention, damping means will preferably be provided connecting said lever 10, which is connected to said jet nozzle 1 and said lever 18 which is connected to said diaphragm chamber diaphragm. Any suitable damping means may be provided without departing from the scope of the invention. In the illustrative embodiment of the invention shown, said damping means conveniently comprises a damping cylinder 53 carried by a bracket 54 screwed to standards 51, 52 carried by lever 10. A piston 55 working in said cylinder 53 has its rod 56 pivotally connected to a lever 57 which is rigidly mounted upon the lever 20.

The operation is as follows:

If the compass deviates relative to its casing, said deviation will be transmitted through the diaphragm of the chamber 15 and, through the squared portion of the shaft 19, will rotate the lever 20. The levers 31 and 32, held together by the spring 33, will turn the lever 26 and consequently the lever 10 and the spray nozzle 1. As soon as said nozzle reaches the end of its stroke which is determined by a stop, said levers 25 and 26 separate scissorlike, said lever 25 remaining stationary while said lever 26, in response to the further movement of said diaphragm will continue to be moved in the one or the other direction. The damping system 55 will also be moved slowly relatively to the damping cylinder in correspondence to the damping adjustment. If now the pneumatic compass goes back said diaphragm immediately begins to carry back said jet nozzle, for the reason that said damping cylinder at first operates as a rigid connection. The rudder will therefore be moved to a reverse steering position, even before the aircraft has returned to the zero position. Said rudder will be held in such reverse steering position until said damping cylinder yields gradually. By suitable adjustment of the damping and of the spring action the degree and length of said reverse steering action can be suitably determined and regulated. Adjustment of the action of the spring 33 can be effected by providing a plurality of securing points, such as holes 60, 61 in the levers 31, 32. A fine adjustment is obtained by the adjustability of the carriage 41 by means of the screw spindle 45. Such adjustment results in varying, lengthwise of the levers 25 and 26, the point at which the rollers 37 and 38 engage said levers, said point of engagement being thus adjusted nearer to or further away from the fulcrums of said levers. In order that such operation may be effected, free from any binding action or other injurious action whatsoever, the fulcrum of the connecting member 34 as well as those of levers 31 and 32 are carried by the carriage 41. Means are also provided for the preliminary adjustment of the tension of spring 33. In the embodiment of the invention herein described for illustrative purposes, this may be provided for by tapering said levers 25 and 26 in the direction of their fulcra as, in most cases such preliminary increase or decrease in the tension of said spring will have to be effected simultaneously with the shortening or lengthening of the effective length of said levers 25, 26.

It is to be understood that the present invention may be embodied in other specific forms without departing from the spirit or essential attributes of said invention, and I therefore desire that the present embodiment be considered in all respects as illustrative and not restrictive, reference being had to the appended claims rather than to the foregoing description to indicate the scope of the invention.

I claim:

1. Automatic controlling apparatus, more particularly for aircraft, comprising, in combination, flight controlling means; power operated operating mechanism therefor; means to control the power operation of said mechanism; automatic means to act upon said power operation controlling means to move said flight controlling means in a direction to return the aircraft to its course upon its deviation therefrom; and means, including a resilient connection and damping means between said automatic means and said power operation controlling means, whereby said flight controlling means will be moved in the opposite direction before the aircraft has returned to its course.

2. Automatic controlling apparatus, more particularly for aircraft, comprising, in combination, flight controlling means; power operated operating mechanism therefor; measuring means to exert an automatic controlling action upon said power operation controlling means; and means including a resilient connection and damping means between said measuring means and said power operation controlling means.

3. Automatic controlling apparatus, more particularly for aircraft, comprising, in combination, flight controlling means; power operated operating mechanism therefor; measuring means to exert an automatic controlling action upon said power operation controlling means; means including a resilient connection and damping means between said measuring means and said power operation controlling means; and means preliminarily to adjust said measuring means.

4. Automatic controlling apparatus, more particularly for aircraft comprising, in combination, flight controlling means; power operated operating mechanism therefor; measuring means to exert an automatic controlling action upon said power operation controlling means; and intermediate connections between said measuring means and said power operation controlling means, including two levers relatively rotatable about a common fulcrum and connected by a resilient connection and an intermediate damping means.

5. Automatic controlling apparatus, more particularly for aircraft, comprising in combination, flight controlling means; power operated operating mechanism therefor; measuring means to exert an automatic controlling action upon said power operation controlling means; and operative connections between said measuring means and said power operation controlling means including two levers relatively rotatable about a common fulcrum; a connecting member; two arms pivoted at one end to said connecting member and adapted with their other ends to engage said two levers and maintain them in alignment; and a spring connecting said two arms.

6. Automatic controlling apparatus, more particularly for aircraft, comprising in combination, flight controlling means; power operated operating mechanism therefor; measuring means to exert an automatic controlling action upon said power operation controlling means; operative connections between said measuring means and said power operation controlling means including two levers relatively rotatable about a common fulcrum; a rotatable connecting member; two arms pivoted at one end to said connecting member and adapted to engage said two levers and maintain them in alignment; and means to adjust the points of engagement of said arms with said levers longitudinally of the latter.

7. Automatic controlling apparatus, more particularly for aircraft, comprising in combination, flight controlling means; power operated operating mechanism therefor; measuring means to exert an automatic controlling action upon said power operation controlling means; operative connections between said measuring means and said power operation controlling means comprising two levers relatively rotatable about a common fulcrum; means to engage said two levers and maintain them in alignment; and means yieldingly to maintain said last named means in engagement with said two levers.

8. Automatic controlling apparatus, more particularly for aircraft, comprising in combination, flight controlling means; power operated operating mechanism therefor; measuring means to exert an automatic controlling action upon said power operation controlling means; operative connections between said measuring means and said power operation controlling means comprising two levers relatively rotatable about a common fulcrum; means to maintain said two levers in alignment; means yieldingly to maintain said maintaining means in engagement with said two levers; and means to adjust the point of engagement of said maintaining means with said levers longitudinally of the latter.

9. Automatic controlling apparatus, more particularly for aircraft, comprising in combination, flight controlling means; measuring means to exert an automatic controlling action upon said flight controlling means; operative connections between said measuring means and said flight controlling means comprising two levers rotatable about a common fulcrum; means to maintain said two levers in alignment; means yieldingly to maintain said maintaining means in engagement with said two levers; means to adjust the point of engagement of said maintaining means with said levers longitudinally of the latter; and means to hold said maintaining means in adjusted position.

10. Automatic controlling apparatus, more particularly for aircraft comprising in combination, flight controlling means; measuring means to exert an automatic controlling action upon said flight controlling means; operative connections between said flight controlling means and said measuring means comprising two levers rotatable about a common fulcrum; means to maintain said two levers in alignment; resilient means yieldingly to maintain said maintaining means in engagement with said two levers; and means permitting adjustment of said resilient means relatively to said maintaining means.

11. Automatic controlling apparatus, more particularly for aircraft, comprising in combination, flight controlling means; measuring means to exert an automatic controlling action upon said flight controlling means; operative connections between said measuring means and said flight controlling means comprising two levers rotatable about a common fulcrum; means to maintain said two levers in alignment; resilient means yieldingly to maintain said maintaining means in engagement with said two levers; and means variably to adjust the tension of said resilient means.

12. Automatic controlling apparatus, more particularly for aircraft, comprising in combination, flight controlling means; measuring means to exert an automatic controlling action upon said flight controlling means; and means including a resilient connection and damping means in the operative connection between said measuring means and said flight controlling means.

WALDEMAR MÖLLER.